(12) United States Patent
Yamashita

(10) Patent No.: US 8,667,834 B2
(45) Date of Patent: Mar. 11, 2014

(54) ABNORMALITY DETECTION APPARATUS AND ABNORMALITY DETECTION METHOD FOR RANKINE CYCLE SYSTEM

(75) Inventor: Yoshiyuki Yamashita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/985,714

(22) PCT Filed: Feb. 16, 2012

(86) PCT No.: PCT/IB2012/000340
§ 371 (c)(1),
(2), (4) Date: Aug. 15, 2013

(87) PCT Pub. No.: WO2012/110893
PCT Pub. Date: Aug. 23, 2012

(65) Prior Publication Data
US 2013/0319097 A1    Dec. 5, 2013

(30) Foreign Application Priority Data

Feb. 17, 2011   (JP) ................................ 2011-032281

(51) Int. Cl.
G01M 15/05    (2006.01)
(52) U.S. Cl.
USPC ...................................................... 73/114.68
(58) Field of Classification Search
USPC ...................................................... 73/114.68
See application file for complete search history.

(56) References Cited

U.S. PATENT DOCUMENTS

| 4,326,391 | A * | 4/1982 | Sato et al. ........................ 62/402 |
| 2005/0072155 | A1 | 4/2005 | Tsutsui et al. |
| 2005/0262858 | A1 | 12/2005 | Inaba et al. |
| 2008/0314073 | A1 * | 12/2008 | Minor ............................. 62/498 |

FOREIGN PATENT DOCUMENTS

| JP | 11 36818 | 2/1999 |
| JP | 2004 339965 | 12/2004 |
| JP | 2005 146990 | 6/2005 |
| JP | 2006 17108 | 1/2006 |
| JP | 2006 283675 | 10/2006 |
| JP | 2008 169760 | 7/2008 |

(Continued)

OTHER PUBLICATIONS

International Search Report Issued Jun. 28, 2012 in PCT/IB12/00340 Filed Feb. 16, 2012.

*Primary Examiner* — Eric S McCall
(74) *Attorney, Agent, or Firm* — Oblon, Spivak, McClelland, Maier & Neustadt, L.L.P.

(57) ABSTRACT

An abnormality detection apparatus for a Rankine cycle system includes: a main body that vaporizes a cooling medium that circulates in an internal combustion engine by giving waste heat to the cooling medium; a gas-liquid separator that separates the cooling medium into a gas-phase and a liquid-phase; a superheater that gives waste heat of the engine to the cooling medium; a condensate header tank that stores the liquid-phase cooling medium; a vane pump that pumps the liquid-phase cooling medium. If abnormality of a cooling medium supply portion that supplies the cooling medium to the engine is not detected, the abnormality detection apparatus determines whether a vane pump has abnormality on the basis of the amount of the liquid-phase cooling medium in the gas-liquid separator, the temperature of the gas-phase cooling medium in the superheater and the amount of the liquid-phase cooling medium in the condensate header tank.

6 Claims, 7 Drawing Sheets

(56) References Cited

FOREIGN PATENT DOCUMENTS

| JP | 2009 79505 | 4/2009 |
| JP | 2010 127138 | 6/2010 |
| JP | 2010 133299 | 6/2010 |
| JP | 2010 174848 | 8/2010 |
| JP | 2010 242516 | 10/2010 |

* cited by examiner

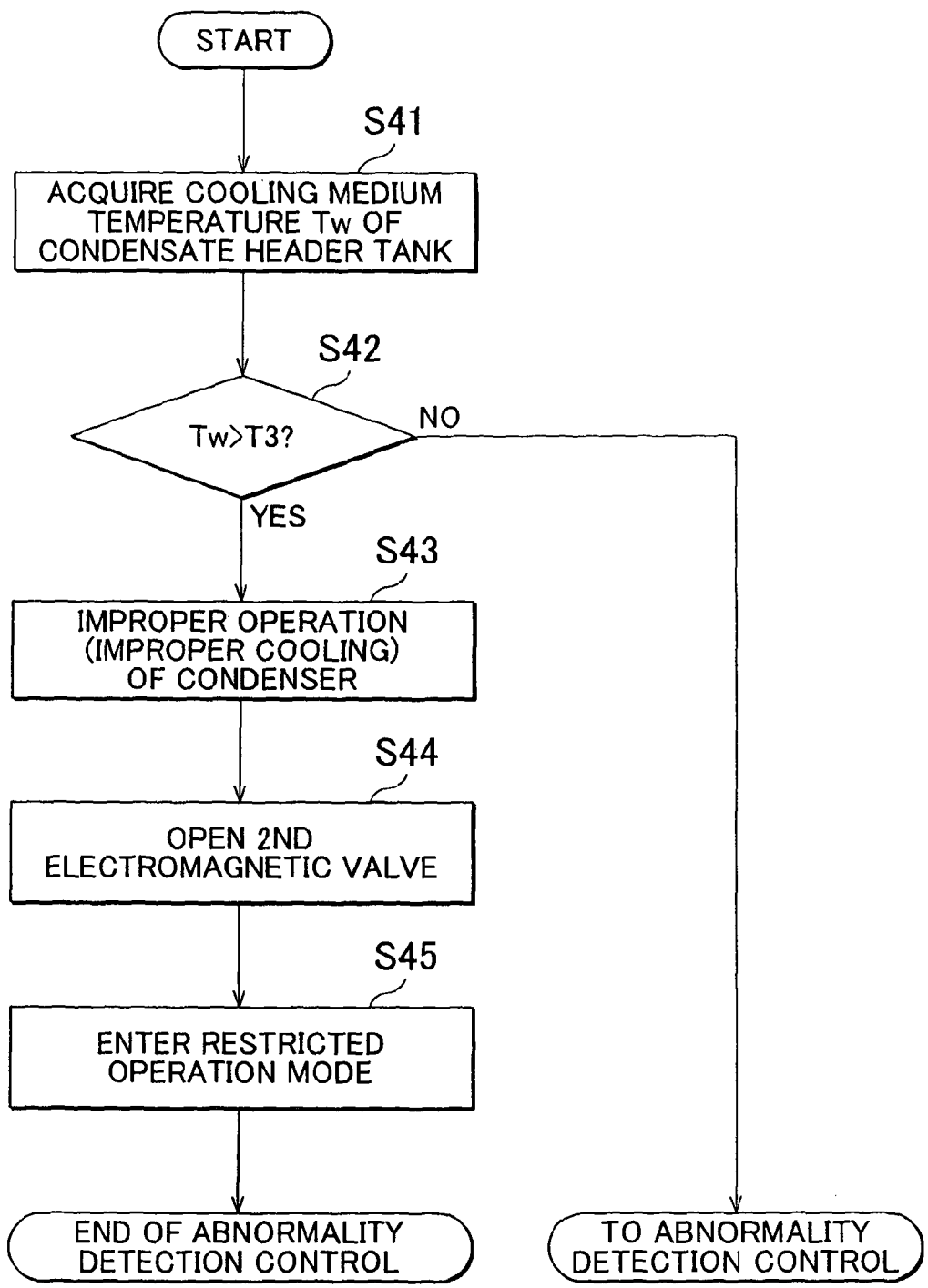

ABNORMALITY DETECTION APPARATUS AND ABNORMALITY DETECTION METHOD FOR RANKINE CYCLE SYSTEM

BACKGROUND OF THE INVENTION

1. Field of the Invention

The invention relates to an abnormality detection apparatus and an abnormality detection method for a Rankine cycle system in which waste heat produced by an internal combustion engine is recovered via vapor.

2. Description of Related Art

A waste heat recovery apparatus that recovers waste heat produced in connection with the driving of an internal combustion engine by using the Rankine cycle is known. In a waste heat recovery apparatus of this kind, a water-cooled cooling system of an internal combustion engine is constructed so as to have a sealed structure, and an expander (turbine) is driven by using a cooling medium (vapor) vaporized by waste heat of the internal combustion engine, and thermal energy that the vapor has is recovered by converting it into mechanical power or electric energy. For example, a waste heat recovery apparatus described in Japanese Patent Application Publication No. 2008-169760 (JP-A-2008-169760) converts thermal energy into electric energy by supplying the coolant from the engine to a superheater via a gas-liquid separator so that the coolant vaporizes, and then actuating the expander through the use of the generated vapor.

Besides, apparatuses that determine the presence or absence of failure of such a waste heat recovery apparatus have been disclosed as mentioned below. A waste heat recovery apparatus described in Japanese Patent Application Publication No. 2010-174848 (JP-A-2010-174848) determines whether a cooling medium pump has failure by monitoring the pressure in a circuit of the Rankine cycle by using a cooling medium pressure sensor that is provided in a flow path between a cooling medium pump and an evaporator. A heat cycle apparatus described in Japanese Patent Application Publication No. 2006-17108 (JP-A-2006-17108) determines whether the Rankine cycle has abnormality by comparing a difference value between an upstream pressure value and a downstream pressure value of a liquid pump with a predetermined pressure value. A cooling apparatus for an engine described in Japanese Patent Application Publication No. 2009-79505 (JP-A-2009-79505) determines that an electric water pump has a failure if at the elapse of more than a predetermined time after the electric water pump is activated, the liquid surface level in the water jacket has not reached a liquid surface level that is expected to be reached on the basis of the amount of the coolant pumped by the electric water pump while a coolant is supplied from a thermal storage tank into a water jacket, and determines that there is clogging of an electromagnetic valve or of a coolant passageway if at the time of discharging the coolant from the water jacket into the thermal storage tank, the liquid surface level in the water jacket is not declining.

By the way, in a Rankine cycle system that recovers waste heat of an internal combustion engine, waste heat from the internal combustion engine cannot be recovered if the cooling medium or vapor that is a working fluid does not circulate normally in the Rankine cycle system. When the working fluid does not circulate normally in the Rankine cycle system, various causes are conceivable, including a failure of a cooling system of the internal combustion engine, a failure of an electromagnetic valve or a water pump disposed in a passageway through which the working fluid circulates, a leak of the working fluid between passageways, etc. Therefore, in order to specifically determine the cause of the working fluid failing to circulate normally in the Rankine cycle system, it cannot be said to be sufficient to merely perform a determination regarding a single cause. That is, it is necessary to synthetically perform determination regarding events that can be causes of the failure in the normal circulation of the working fluid in the Rankine cycle. However, although there have been disclosed apparatuses that perform determination regarding individual causes of the failure in the normal circulation of the working fluid in the Rankine cycle system, a construction that synthetically performs determination regarding such causes has not been disclosed. Hence, the Rankine cycle system still has room for betterment.

SUMMARY OF THE INVENTION

Accordingly, the invention provides an abnormality detection apparatus and an abnormality detection method that improve the accuracy in specifically determining the cause of the working fluid failing to circulate normally in the Rankine cycle system.

A first aspect of the invention relates to an abnormality detection apparatus for a Rankine cycle system. The Rankine cycle system includes: a main body of an internal combustion engine which vaporizes a cooling medium that circulates in the internal combustion engine by giving waste heat to the cooling medium; a gas-liquid separator that, downstream of the main body, separates the cooling medium into a gas-phase cooling medium and a liquid-phase cooling medium; a superheater that, downstream of the gas-liquid separator, gives waste heat of the internal combustion engine to the cooling medium; a waste heat recoverer that, downstream of the superheater, recovers energy of the waste heat that the cooling medium has obtained; a condenser that, downstream of the waste heat recoverer, condenses the gas-phase cooling medium; a header tank that is disposed downstream of the condenser, and that stores the liquid-phase cooling medium; and a pumper that is positioned between the header tank and the main body and that pumps the liquid-phase cooling medium in the header tank to the main body. The abnormality detection apparatus for the Rankine cycle system includes: a cooling medium amount detector that detects amount of the liquid-phase cooling medium in the gas-liquid separator; a temperature detector that detects temperature of the gas-phase cooling medium in the superheater; a header tank cooling medium amount detector that detects amount of the liquid-phase cooling medium in the header tank; a first abnormality detection portion that detects whether there is abnormality of a cooling medium supply portion that supplies the cooling medium to the main body; and a second abnormality detection portion that detects whether there is abnormality of the control valve based on the amount of the liquid-phase cooling medium in the gas-liquid separator, the temperature of the gas-phase cooling medium in the superheater and the amount of the liquid-phase cooling medium in the header tank if abnormality is not detected by the first abnormality detection portion.

According to the foregoing construction, it is possible to specifically determine whether the improper circulation of the cooling medium that circulates in the internal combustion engine is due to abnormality of the pumper. Furthermore, the cause of the improper circulation of the cooling medium is synthetically determined on the basis of various pieces of information regarding the Rankine cycle system, so that the accuracy in specifically determining the cause of failure can be improved.

In the abnormality detection apparatus for the Rankine cycle system, there may be provided a construction in which the second abnormality detection portion determines that the pumper has abnormality provided that the amount of the liquid-phase cooling medium in the gas-liquid separator is outside a predetermined range, and that the temperature of the gas-phase cooling medium in the superheater is outside a predetermined range, and that the amount of the liquid-phase cooling medium in the header tank is outside a predetermined range.

Furthermore, in the abnormality detection apparatus for the Rankine cycle system, the second abnormality detection portion may determine that the pumper is in a state of closed fixture or operation stop provided that the amount of liquid-phase cooling medium in the gas-liquid separator is less than a first threshold value, and that the temperature of the gas-phase cooling medium in the superheater is greater than or equal to a second threshold value, and that the amount of the liquid-phase cooling medium in the header tank is greater than a third threshold value.

Besides, in the abnormality detection apparatus for the Rankine cycle system, the second abnormality detection portion may determine that the gas-liquid separator has abnormality provided that the amount of the liquid-phase cooling medium in the gas-liquid separator is less than a first threshold value, and that the temperature of the gas-phase cooling medium in the superheater is greater than or equal to a second threshold value, and that the amount of the liquid-phase cooling medium in the header tank is less than or equal to a third threshold value.

Besides, in the abnormality detection apparatus for the Rankine cycle system, the second abnormality detection portion may determine that there is open fixture of the pumper or closed improper closure of the pumper caused by caught-up dust or the like provided that the amount of the liquid-phase cooling medium in the gas-liquid separator is greater than a fourth threshold value, and that the temperature of the gas-phase cooling medium in the superheater is less than or equal to a fifth threshold value, and that the amount of the liquid-phase cooling medium in the header tank is less than a sixth threshold value.

Besides, in the abnormality detection apparatus for the Rankine cycle system, the second abnormality detection portion may re-determine whether the cooling medium supply portion has abnormality provided that the amount of the liquid-phase cooling medium in the gas-liquid separator is greater than a fourth threshold value, and that the temperature of the gas-phase cooling medium in the superheater is less than or equal to a fifth threshold value, and that the amount of the liquid-phase cooling medium in the header tank is greater than or equal to a sixth threshold value.

A second aspect of the invention relates to an abnormality detection method for a Rankine cycle system. The Rankine cycle system includes: a main body of an internal combustion engine which vaporizes a cooling medium that circulates in the internal combustion engine by giving waste heat to the cooling medium; a cooling medium supply portion that supplies the cooling medium to the main body; a gas-liquid separator that, downstream of the main body, separates the cooling medium into a gas-phase cooling medium and a liquid-phase cooling medium; a superheater that, downstream of the gas-liquid separator, gives waste heat of the internal combustion engine to the cooling medium; a header tank that, downstream of the condenser, stores the liquid-phase cooling medium; and a pumper that is positioned between the header tank and the main body and that pumps the liquid-phase cooling medium in the header tank to the main body. The abnormality detection method for the Rankine cycle system includes: detecting amount of the liquid-phase cooling medium in the gas-liquid separator; detecting temperature of the gas-phase cooling medium in the superheater; detecting amount of the liquid-phase cooling medium in the header tank; detecting whether there is abnormality of the cooling medium supply portion; and detecting whether there is abnormality of the control valve based on the amount of the liquid-phase cooling medium in the gas-liquid separator, the temperature of the gas-phase cooling medium in the superheater and the amount of the liquid-phase cooling medium in the header tank if abnormality of the cooling medium supply portion is not detected.

The invention improves the accuracy in specifically determining the cause of the working fluid failing to normally circulate in the Rankine cycle system, by detecting whether there is abnormality of the cooling medium supply portion that supplies the cooling medium to the internal combustion engine, and whether there is abnormality of the pumper that pumps the cooling medium.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart showing a subroutine of the abnormality detection process for a condenser mentioned in FIG. 3.

DETAILED DESCRIPTION OF EMBODIMENTS

Hereinafter, embodiments of the invention will be described in detail with reference to the drawings.

Figure 1:
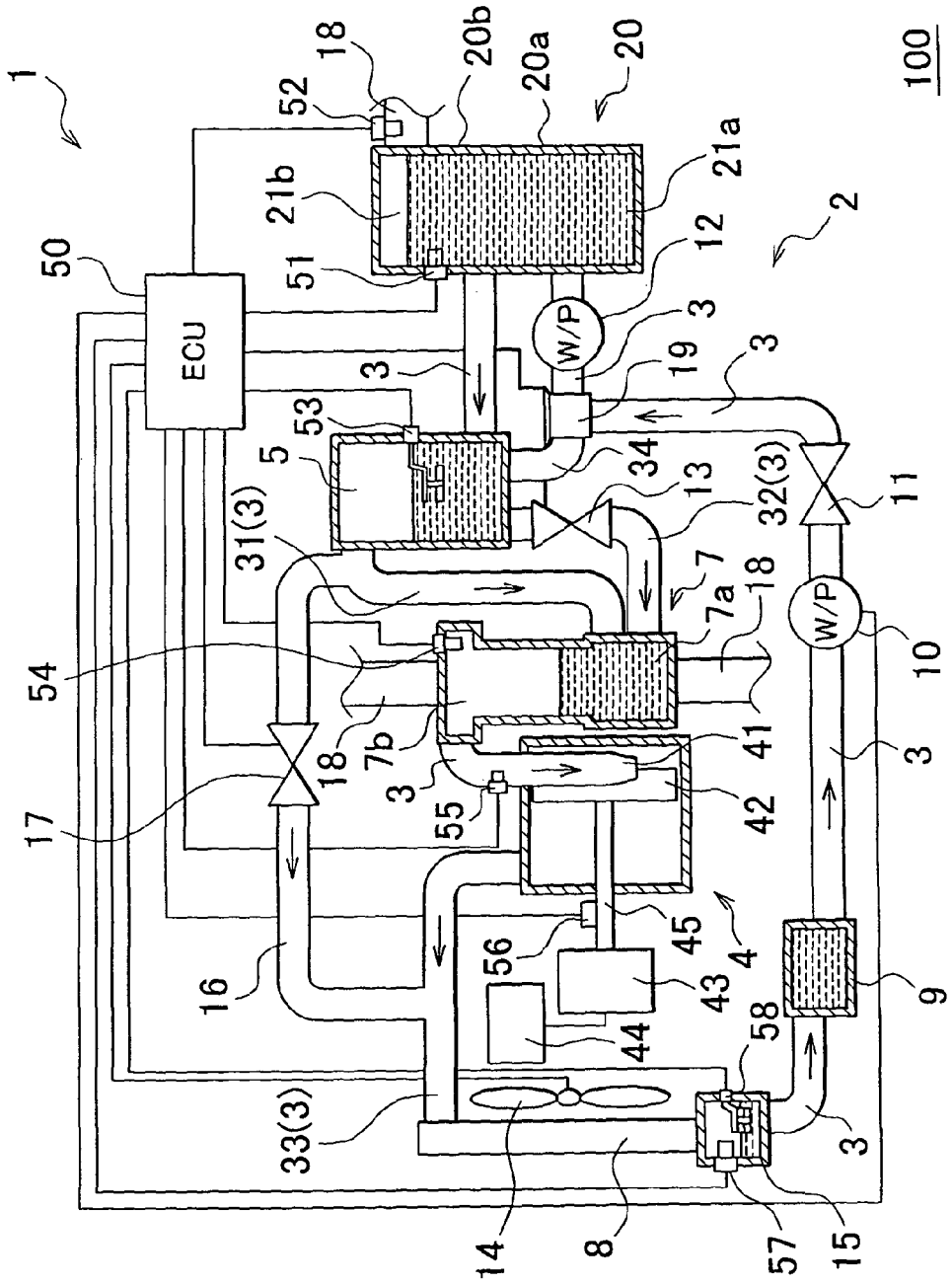
FIG. 1 is an illustrative diagram showing a general construction of an abnormality detection apparatus for a Rankine cycle system.

[EMBODIMENTS] FIG. 1 is an illustrative diagram showing a general construction of an abnormality detection apparatus 100 for a Rankine cycle system 1 (hereinafter, simply referred to as "abnormality detection apparatus 100") in accordance with an embodiment of the invention. The Rankine cycle system 1 includes an internal combustion engine 2, a cooling medium passageway 3 and a waste heat recoverer 4. The Rankine cycle system 1 uses as a cooling medium that circulates in the internal combustion engine 2 as a working fluid of the Rankine cycle. A main body 20 of the internal combustion engine 2 gives waste heat to the cooling medium and therefore vaporizes the cooling medium.

The engine main body 20 includes a cylinder block 20a in which a block-side water jacket 21a is formed, and a cylinder head 20b in which a head-side water jacket 21b is formed. Both the block-side water jacket 21a and the head-side water jacket 21b are connected to the cooling medium passageway 3. The cooling medium flows from the head-side water jacket 21b into the cooling medium passageway 3, and flows from the cooling medium passageway 3 into the block-side water jacket 21a. That is, the cooling medium passageway 3, together with the head-side water jacket 21b and the block-side water jacket 21a, forms a loop-shaped route through which the cooling medium circulates. Arrows shown in FIG. 1 show the directions in which the cooling medium flows.

On the cooling medium passageway 3, there are disposed a gas-liquid separator 5, a superheater 7, the waste heat recoverer 4, a condenser 8, a condensate tank 9, a vane pump 10, a check valve H, a thermostat 19 and a water pump 12 in that order from an upstream side in terms of the flow of the cooling medium. As the water pump 12 works, the cooling medium in the cooling medium passageway 3, the block-side water jacket 21a and the head-side water jacket 21b moves.

During operation of the internal combustion engine 2, the cooling medium in the block-side water jacket 21a and the head-side water jacket 21b cools the cylinder block 20a and the cylinder head 20b. The cooling medium, when cooling the cylinder block 20a and the cylinder head 20b, receives heat from the cylinder block 20a and the cylinder head 20b, so that the temperature of the cooling medium increases. The cooling medium, receiving heat in the cylinder block 20a and the cylinder head 20b, partly vaporizes.

When the working of the water pump 12 causes flow of the cooling medium in the cooling medium passageway 3, the cooling medium in the block-side water jacket 21a and the head-side water jacket 21b is sent to the gas-liquid separator 5 positioned at a downstream side of the engine engine main body 20. The gas-liquid separator 5 separates the cooling medium into a gas-phase cooling medium (vapor) and a liquid-phase cooling medium. At the downstream side of the gas-liquid separator 5, the superheater 7 is disposed. The gas-liquid separator 5 and the superheater 7 are connected by a passageway 31 and a passageway 32. The passageway 31 and the passageway 32 are portions of the cooling medium passageway 3. The passageway 31 is constructed so as to convey the gas-phase cooling medium separated at the gas-liquid separator 5. The passageway 32 is constructed so as to convey the liquid-phase cooling medium separated at the gas-liquid separator 5. The passageway 32 is provided with a first electromagnetic valve 13. The first electromagnetic valve 13 can be regarded as a control valve in the invention. When the first electromagnetic valve 13 opens, the liquid-phase cooling medium is sent from the gas-liquid separator 5 toward the superheater 7 through the passageway 32. Thus, a construction is provided such that if the liquid-phase cooling medium in the superheater 7 becomes insufficient in amount, the liquid-phase cooling medium can be supplied from the gas-liquid separator 5.

The superheater 7 gives waste heat of the internal combustion engine 2 to the gas-phase cooling medium and the liquid-phase cooling medium. Concretely, the superheater 7 includes an evaporating portion 7a that vaporizes the liquid-phase cooling medium, and a superheating portion 7b that gives heat to the gas-phase cooling medium and therefore increases the temperature the gas-phase cooling medium. Within the superheater 7, a passageway in which the cooling medium passes and a passageway in which exhaust gas discharged from the internal combustion engine 2 passes are separately formed, and are constructed so that the cooling medium and the exhaust gas exchange heat within the superheater 7. Due to this construction, the liquid-phase cooling medium in the evaporating portion 7a receives heat from the exhaust gas, and thus vaporizes. The vaporized (gas-phase) cooling system moves to the superheating portion 7b. The gas-phase cooling medium in the superheating portion 7b obtains heat from the exhaust gas, and turns into high-temperature and high-pressure vapor. Incidentally, the superheating portion 7b is disposed so as to contact exhaust gas whose temperature is higher than the temperature of the exhaust gas that contacts the evaporating portion 7a.

The gas-phase cooling medium (vapor) assuming a state of high temperature and high pressure due to heat obtained from exhaust gas in the superheater 7 is sent to the waste heat recoverer 4. The waste heat recoverer 4 is an apparatus that recovers energy of the waste heat that the cooling medium receives from the internal combustion engine 2. The waste heat recoverer 4 is a unit for recovering waste heat which includes a supersonic nozzle 41, a turbine 42, an electricity generator 43, a storage battery 44 and a shaft 45. The high-temperature and high-pressure vapor is jetted from the supersonic nozzle 41 to the turbine 42. Therefore, the turbine 42 turns. The turbine 42 and the electricity generator 43 are connected by the shaft 45. When the turbine 42 obtains a predetermined rotation speed and a predetermined torque, the electricity generator 43 becomes able to generate electricity. The electricity generated by the electricity generator 43 is stored into the storage battery 44. In this manner, the waste heat recoverer 4 recovers energy from the cooling medium vaporized due to the waste heat of the internal combustion engine 2.

The vapor jetted to the turbine 42 in the waste heat recoverer 4 is sent to the condenser 8 through the passageway 33. This passageway 33 is a portion of the cooling medium passageway 3. The condenser 8 condenses the gas-phase cooling medium sent through the passageway 33 into the liquid phase. The condenser 8 cools the cooling medium by sending the cooling medium into finely divided conduits and thus accelerating heat exchange with atmospheric air. The internal combustion engine 2 is provided with a cooling fan 14 that forces the atmospheric air to be supplied to the condenser 8. An discharge opening of the condenser 8 is provided with a condensate header tank 15 that temporarily stores the cooling medium condensed in the condenser 8.

The cooling medium in the condensate header tank 15 is then sent to the condensate tank 9. The cooling medium stored in the condensate tank 9 is sent to the downstream side by the vane pump 10. The vane pump 10 is positioned between the condensate header tank 15 and the engine main body 20, and can be regarded as a pumper in the invention that pumps the liquid-phase cooling medium in the condensate header tank 15 to the engine main body 20 side. The cooling medium pumped by the vane pump 10 is supplied to the block-side water jacket 21a by the water pump 12, and circulates in the internal combustion engine 2. The check valve 11 between the vane pump 10 and the water pump 12 prevents the cooling medium from flowing backward to the vane pump 10. A passageway 34 is formed so as to provide communication between the thermostat 19 and a bottom portion of the gas-liquid separator 5. The passageway 34 is a portion of the cooling medium passageway 3. The thermostat 19 changes the passageway of the cooling medium depending on the temperature of the cooling medium. Specifically, when the temperature of the cooling medium is greater than or equal to a predetermined temperature, the thermostat 19 connects passageways so that the cooling medium from the vane pump 10 flows into the water pump 12 and therefore the cooling medium cooled by the condenser 8 is introduced into the water pump 12 and then into the engine main body 20 of the internal combustion engine 2. On the other hand, when the temperature of the cooling medium is less than the predetermined temperature, the thermostat 19 shuts down the passageway that connects the vane pump 10 and the water pump 12, and introduces the cooling medium from the gas-liquid separator 5 into the main body 20 of the internal combustion engine 2. The thermostat 19 and the water pump 12 operate together to function as a cooling medium supply portion that supplies the cooling medium to the main body 20 of the internal combustion engine 2.

Figure 2:
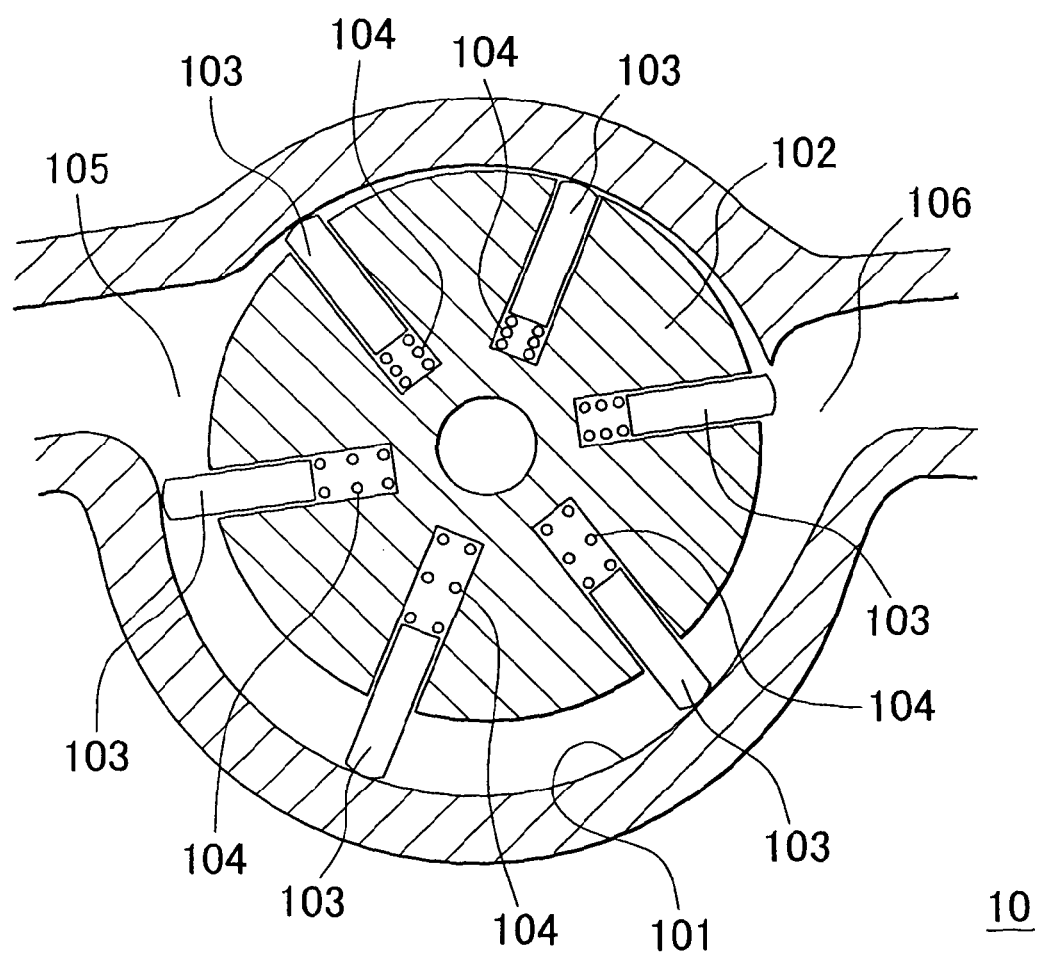
FIG. 2 is an illustrative diagram showing an internal structure of a vane pump.

A construction of the vane pump 10 will be described. FIG. 2 is an illustrative diagram showing an internal construction of the vane pump 10. In the vane pump 10, a rotor 102 is disposed eccentrically to a circular cam ring 101. Vanes 103 are set in the rotor 102 so as to be retractable. The vanes 103 are pressed by springs 104 to a side where a wall surface of the cam ring 101 is present. As the rotor 102 rotates, distal end portions of the vanes 103 moves in contact with the wall surface of the cam ring 101 since the vanes 103 are pressed to the side of the wall surface of the cam ring 101 by the force exerted by the spring 104 and also the centrifugal force. At a suction-side port 105, the cooling medium is pushed in by the vanes 103 and is thus sucked into the pump as the rotor 102 rotates. On the other hand, at a send-out-side port 106, the cooling medium is pushed out by the vanes 103. The vane pump 10 is an electric type pump, and works in accordance with a drive command from an ECU 50 described later.

As described above, in the engine main body 20 and the superheater 7, the cooling medium absorbs waste heat of the internal combustion engine 2, and becomes a high-temperature and high-pressure vapor. The waste heat recoverer 4 recovers thermal energy of the vaporized cooling medium by converting it into electric energy. The vaporized cooling medium is condensed into a liquid state again by the condenser 8, and then is re-sent to the engine main body 20. The cooling medium thus circulates in the Rankine cycle system 1. Therefore, the Rankine cycle system 1 forms a Rankine cycle that uses the cooling medium as a working fluid.

Besides, the Rankine cycle system 1 includes a bypass passageway 16. The bypass passageway 16 connects the passageway 31 and the passageway 33. The bypass passageway 16 is provided with a second electromagnetic valve 17. When the second electromagnetic valve 17 is opened, the gas-phase cooling medium separated in the gas-liquid separator 5 passes through the bypass passageway 16. The gas-phase cooling medium that passes through the bypass passageway 16 bypasses the superheater 7 and the waste heat recoverer 4.

Furthermore, the Rankine cycle system 1 includes: a water temperature sensor 51 that detects the temperature of the cooling medium in the engine main body 20; an exhaust gas temperature sensor 52 that detects the temperature of exhaust gas of the internal combustion engine 2; a liquid surface sensor 53 that detects the liquid surface level of the liquid-phase cooling medium in the gas-liquid separator 5; a vapor temperature sensor 54 that detects the temperature of the gas-phase cooling medium (vapor) present in the superheater 7; a pressure sensor 55 that detects the vapor pressure of the cooling medium after passage through the superheater 7; a rotation speed sensor 56 that detects the rotation speed of the turbine 42; a condensate water temperature sensor 57 that detects the temperature of the cooling medium after passage through the condenser 8; and a header tank liquid surface sensor 58 that detects the liquid surface level of the liquid-phase cooling medium in the condensate header tank 15. In particular, the liquid surface sensor 53 is able to detect the amount of the liquid phase-cooling medium present in the gas-liquid separator 5 by detecting the liquid surface level of the liquid-phase cooling medium in the gas-liquid separator 5. Besides, the header tank liquid surface sensor 58 is able to detect the amount of the liquid-phase cooling medium present in the condensate header tank 15 by detecting the liquid surface level of the liquid-phase cooling medium in the condensate header tank 15.

The positions of these sensors are as follows. The water temperature sensor 51 is provided in the head-side water jacket 21b. The exhaust gas temperature sensor 52 is provided in the exhaust pipe 18. The liquid surface sensor 53 is provided in the gas-liquid separator 5. The vapor temperature sensor 54 is provided in the superheating portion 7b of the superheater 7. The pressure sensor 55 is provided in the cooling medium passageway 3 for supplying the cooling medium to the supersonic nozzle 41. The rotation speed sensor 56 is provided at the shaft 45 of the turbine 42. The condensate water temperature sensor 57 and the header tank liquid surface sensor 58 are provided in the condensate header tank 15.

These sensors are connected to the ECU (electronic control unit) 50. The ECU 50 is made up of a digital computer of a known format in which a CPU (central processing unit), a RAM (random access memory), a ROM (read-only memory), and an input/output port are connected by a bidirectional bus. The ECU 50 performs various controls by receiving signals from and sending signals to the various sensors and actuators and the like that are provided for controlling the Rankine cycle system 1 or the internal combustion engine 2. Particularly in this embodiment, the ECU 50 is electrically connected to each of the water temperature sensor 51, the exhaust gas temperature sensor 52, the liquid surface sensor 53, the vapor temperature sensor 54, the pressure sensor 55, the rotation speed sensor 56, the condensate water temperature sensor 57, and the header tank liquid surface sensor 58. Besides, the ECU 50 is also electrically connected to the first electromagnetic valve 13, the second electromagnetic valve 17, the vane pump 10 and the cooling fan 14. On the basis of information that the various sensors acquire, the ECU 50 controls the open-closed states of the first electromagnetic valve 13 and the second electromagnetic valve 17, and controls the operation of the vane pump 10 and the cooling fan 14. Incidentally, the first electromagnetic valve 13 is constructed so as to open when electrified and close when dis-electrified.

Furthermore, the ECU 50 functions as a first abnormality detection portion in the invention. Specifically, the ECU 50 detects abnormality of the cooling medium supply portion of the internal combustion engine 2. It is to be noted herein that the abnormality of the cooling medium supply portion of the internal combustion engine 2 refers to a failure of the water pump 12 and improper operation of a thermostat (not shown). Besides, the ECU 50 functions as a second abnormality detection portion in the invention. Specifically, when abnormality of the cooling medium supply portion of the internal combustion engine 2 is not detected, the ECU 50 detects the presence or absence of abnormality of the vane pump 10 on the basis of the amount of the liquid-phase cooling medium present in the gas-liquid separator 5, the temperature of the gas-phase cooling medium present in the superheater 7, and the amount of the liquid-phase cooling medium present in the condensate header tank 15.

Figure 3:
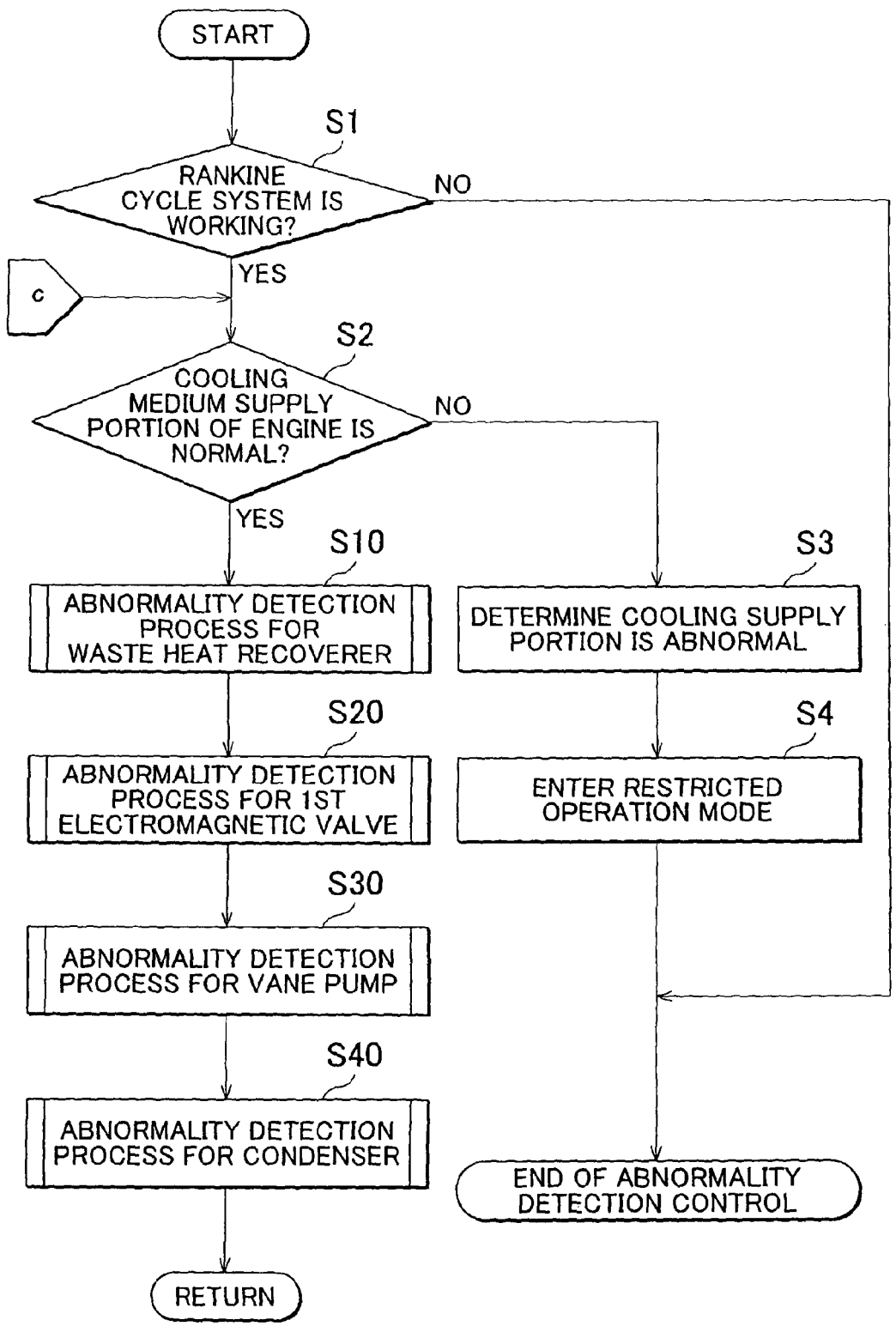
FIG. 3 is a flowchart of an abnormality detection control of an abnormality detection apparatus.

Next, a control that the abnormality detection apparatus 100 performs to detect abnormality of the Rankine cycle system 1 will be described. FIG. 3 is a flowchart of an abnormality detection control of the abnormality detection apparatus 100. This abnormality detection control is performed by the ECU 50. The abnormality detection control in this embodiment will be described below with reference to FIG. 3.

The ECU 50 determines in step 1 whether the Rankine cycle system 1 is working. The ECU 50 determines whether the Ranking cycle system 1 is working on the basis of the cooling medium, temperature in the engine main body 20 and the temperature of exhaust gas discharged from the engine main body 20. The Rankine cycle system 1 cannot work, if vapor is not generated. That is, the Ranking cycle system 1 can work when the cooling medium temperature in the engine main body 20 and the temperature of the exhaust gas from the engine main body 20 are temperatures in a predetermined range of temperature that allows generation of vapor. The ECU 50 determines that the Rankine cycle system 1 is working, if the cooling medium temperature in the engine main body 20 detected by the water temperature sensor 51 and the exhaust gas temperature detected by the exhaust gas temperature sensor 52 are within the predetermined ranges. If the ECU 50 makes an affirmative determination in step S1, that is, if the Rankine cycle system 1 is working, the ECU 50 proceeds to step S2.

In step S2, the ECU 50 determines whether the cooling medium supply portion of the internal combustion engine 2 is normal. In this step, the ECU 50 detects the presence or absence of improper operation of the water pump 12 and the thermostat 19. If there is no improper operation of either the water pump 12 or the thermostat 19, the ECU 50 determines that the cooling medium supply portion of the internal combustion engine 2 is normal. If the water pump 12 has a failure, the amount of discharge of (amount of circulation) the cooling medium decreases, so that the amount of the cooling medium that can be cooled by the condenser 8 decreases and therefore the temperature of the cooling medium in the engine main body 20 continuously rises above an appropriate temperature. Hence, in the case where the measured value from the water temperature sensor 51 continues to abnormally rise above the appropriate temperature of the cooling medium, the ECU 50 determines that the water pump 12 has failed. Besides, if the thermostat 19 fails in such a state that the cooling medium from the vane pump 10 is allowed to flow into the water pump 12, the cooling medium having been cooled by the condenser 8 is constantly supplied to the engine main body 20, so that the temperature measured by the water temperature sensor 51 declines, or stops rising. Therefore, if the value measured by the water temperature sensor 51 has not risen or is continuously declining after a predetermined time elapses following the starting of the internal combustion engine 2, the ECU 50 determines that the thermostat 19 has a failure in a state in which the cooling medium from the vane pump 10 is allowed to flow into the water pump 12. On the other hand, if the thermostat 19 has a failure in a state in which the cooling medium from the vane pump 10 is blocked, the cooling medium cooled by the condenser 8 is not supplied into the engine main body 20, so that the temperature of the cooling medium continuously rises. In this case, the temperature of the cooling medium is stably higher than in the aforementioned case of failure of the water pump 12. Therefore, in the case where the value measured by the water temperature sensor 51 continues rising stably, the ECU 50 determines that the thermostat 19 has failed with the passageway to the condenser 8 closed. If in step S2 the ECU 50 determines that the cooling medium supply portion of the internal combustion engine 2 is normal, the ECU 50 then proceeds to step S10.

In step S10, the ECU 50 performs an abnormality detection process for the waste heat recoverer 4. After finishing the process of step S10, the ECU 50 proceeds to step S20 in which the ECU 50 performs an abnormality detection process for the first electromagnetic valve 13. In the abnormality detection process for the first electromagnetic valve 13, the ECU 50 determines that the first electromagnetic valve 13 is abnormal, if the amount of the liquid-phase cooling medium in the gas-liquid separator 5 is outside a predetermined range and the temperature of the gas-phase cooling medium in the superheater 7 is outside a predetermined range. After finishing the process of step S20, the ECU 50 subsequently performs an abnormality detection process for the vane pump 10 in step S30. In the abnormality detection process for the vane pump 10, the ECU 50 determines that the vane pump 10 is abnormal, if the amount of the liquid-phase cooling medium in the gas-liquid separator 5 is outside a predetermined range and the temperature of the gas-phase cooling medium in the superheater 7 is within a predetermined range and the amount of the liquid-phase cooling medium in the condensate header tank 15 is outside a predetermined range. After finishing the process of step S30, the ECU 50 subsequently performs an abnormality detection process for the condenser 8 in step S40. After finishing the process of step S40, the ECU 50 returns to the previous routine. The abnormality detection process for the waste heat recoverer 4 in step S10, the abnormality detection process for the first electromagnetic valve 13 in step S20, the abnormality detection process for the vane pump 10 in step S30, and the abnormality detection process for the condenser 8 in step S40 will be described in detail below.

In the above-described routine, if the ECU 50 makes a negative determination in step S2, that is, determines that the cooling medium supply portion of the internal combustion engine 2 is not normal, the ECU 50 proceeds to step S3.

In step S3, the ECU 50 determines that the cooling medium supply portion of the internal combustion engine 2 is abnormal, and records it in a storage device (a memory, a ROM, a ROM). Next in step S4, the ECU 50 enters a restricted operation mode. The restricted operation mode is a mode of operation in which the output of the internal combustion engine 2 is restricted. Besides, at this time, the abnormality detection apparatus 100 notifies an operating person that the restricted operation mode has been entered and that there is abnormality in the Rankine cycle system 1.

After finishing the process of step S4, the ECU 50 ends the abnormality detection control. The ECU 50 also ends the abnormality detection control if the ECU 50 makes a negative determination in step S1, that is, if the Rankine cycle system 1 is not working.

Figure 4:
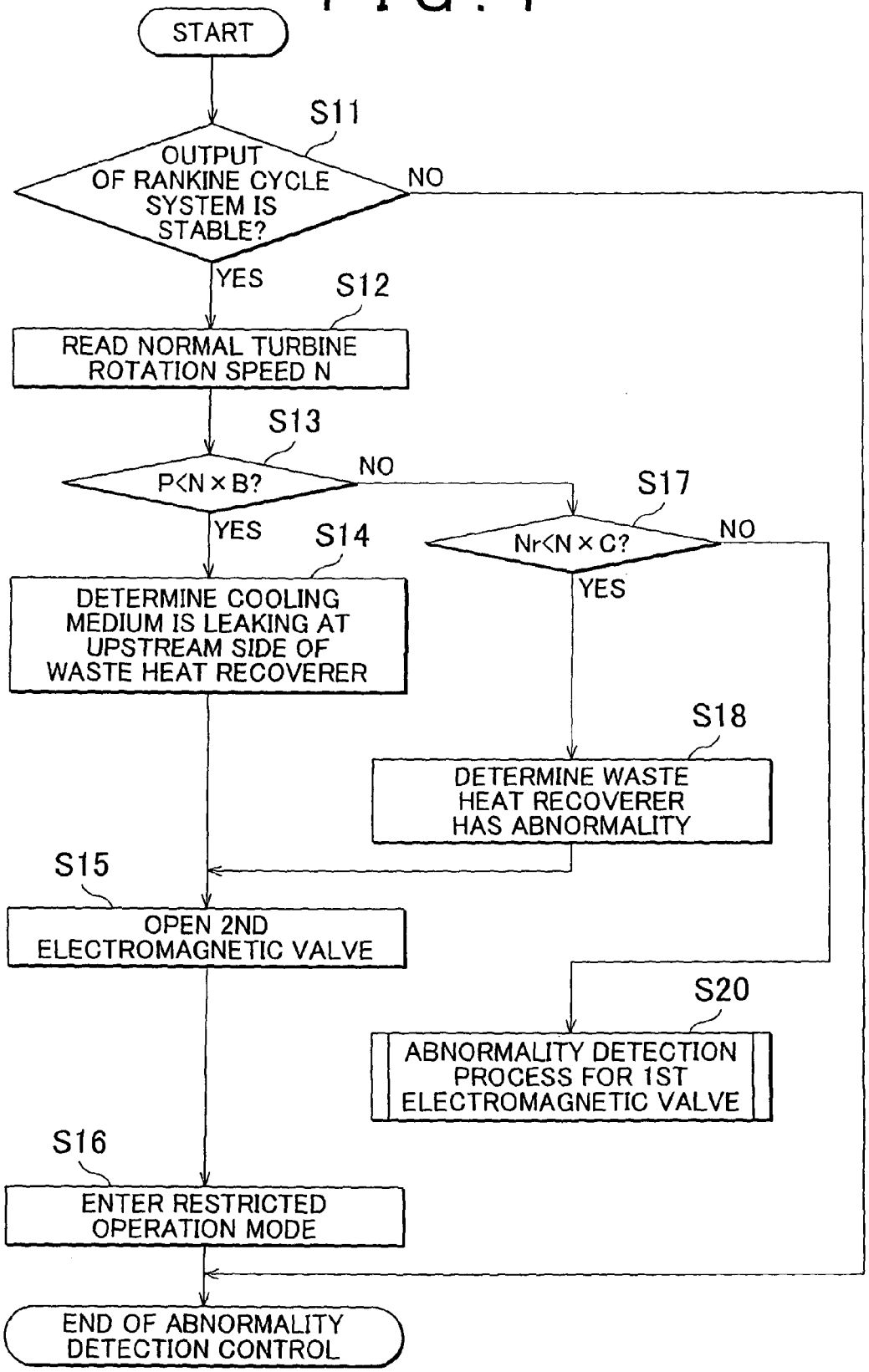
FIG. 4 is a flowchart showing a subroutine of the abnormality detection process for a waste heat recoverer mentioned in FIG. 3.

Next, the abnormality detection process for the waste heat recoverer 4 in step S10 will be described in detail. FIG. 4 is a flowchart showing a subroutine of the abnormality detection process for the waste heat recoverer 4 in step S10. Hereinafter, the abnormality detection process for the waste heat recoverer 4 will be described with reference to FIG. 4.

In step S11, the ECU 50 determines whether the output of the Rankine cycle system 1 is stable. In Rankine cycle system 1, a response delay occurs until the output becomes stable. After the output of the Rankine cycle system 1 stabilizes, the response delay becomes less than or equal to a predetermined value A. Therefore, if the response delay is less than or equal to the predetermined value A, the ECU 50 determines that the output of the Rankine cycle system 1 has stabilized. This process is performed because until the output of the Rankine cycle system 1 stabilizes, it cannot be determined whether a change in the value measured by a sensor is due to abnormality of an appliance or a fluctuation in the Rankine cycle. If the ECU 50 makes an affirmative determination in step S11, that is, if the output of the Rankine cycle system is stable, the ECU 50 proceeds to step S12.

In step S12, the ECU 50 reads the rotation speed N of the turbine 42 that occurs during a normal state. The rotation speed of the turbine 42 during the normal state is determined on the basis of the amount of vapor of the cooling medium calculated from the operation condition of the internal combustion engine 2, the pressure of vapor introduced into the waste heat recoverer 4, and a turbine rotation speed map that is prepared beforehand from values of the amount of vapor and the pressure of vapor. It is to be noted herein that the amount of vapor of the cooling medium is calculated on the basis of the cooling medium temperature in the engine main body 20, the temperature of exhaust gas of the internal combustion engine 2, the rotation speed of a crankshaft (not shown) of the internal combustion engine 2, the load of the internal combustion engine 2, and other information that indicates the state of operation of the internal combustion engine 2. The pressure of vapor introduced into the waste heat recoverer 4 is the pressure of the vapor of the cooling medium having passed through the superheater 7 which is detected by the pressure sensor 55. After finishing the process of step S12, the ECU 50 proceeds to step S13.

In step S13, the ECU 50 determines whether a vapor pressure P at the outlet of the superheater 7 is smaller than the multiplication product of the rotation speed N acquired from the map and a predetermined value 13. If the ECU 50 makes an affirmative determination in step S13, that is, if the vapor pressure P at the outlet of the superheater 7 is smaller than the product of the rotation speed N and the predetermined value B, the ECU 50 proceeds to step S14.

In the case where the actually measured vapor pressure P is smaller than the estimated value N×B based on the turbine rotation speed N acquired from the map, the turbine rotation speed estimated by monitoring the vapor at the superheater 7 is not being obtained, and therefore it is conceivable that there is leakage of vapor. Therefore, the ECU 50 determines in step S14 that there is leakage of the cooling medium at the upstream side of the waste heat recoverer 4, and records it in the storage device. It is to be noted herein that the upstream side of the waste heat recoverer 4 indicates a route from the gas-liquid separator 5 to the waste heat recoverer 4, that is, a cooling medium passageway that introduces the cooling medium into the passageway 31, the superheater 7 and the supersonic nozzle 41. After finishing the process of step S14, the ECU 50 proceeds to step S15.

In step S15, the ECU 50 opens the second electromagnetic valve 17. As the second electromagnetic valve 17 is opened, the gas-phase cooling medium (vapor) separated in the gas-liquid separator 5 is sent to the passageway 33 through the bypass passageway 16. This restrains the vapor from entering the superheater 7 and the waste heat recoverer 4. Therefore, since the entrance of the vapor to the site where leakage of the cooling medium is conceivable, leakage of the cooling medium can be restrained. Then, in step S16, the ECU 50 enters the restricted operation mode. Besides, the ECU 50 notifies the operating person that the restricted operation mode has been entered, and that there is abnormality in the Rankine cycle system 1. Incidentally, in this situation, the first electromagnetic valve 13 is also closed.

After finishing the process of step S16, the ECU 50 ends the abnormality detection control. The ECU 50 also ends the abnormality detection control if in step S11 the ECU 50 makes a negative determination, that is, if the output of the Rankine cycle system is not stable.

If in step S13 the ECU 50 makes a negative determination, that is, if the vapor pressure P at the outlet of the superheater 7 is greater than or equal to the multiplication product of the rotation speed N and the predetermined value B, the ECU 50 proceeds to step S17.

In the case where the vapor pressure P at the outlet of the superheater 7 is greater than or equal to the product of the rotation speed N and the predetermined value B, leakage of the vapor is not assumed. Therefore, a process of detecting whether there is abnormality in other appliances. In step S17, the ECU 50 determines whether the rotation speed Nr of the turbine 42 of the waste heat recoverer 4 is smaller than the multiplication product of the rotation speed N acquired from a map and a predetermined value C. If in step S17 the ECU 50 makes a negative determination, that is, if the rotation speed Nr of the turbine 42 of the waste heat recoverer 4 is smaller than the product of the rotation speed N acquired from the map and the predetermined value C, the ECU 50 proceeds to step S18.

If the actually measured rotation speed Nr of the turbine 42 is smaller than the estimated value N×C based on the rotation speed N acquired from the map, it is conceivable that the waste heat recoverer 4 has an abnormality. Therefore, in step S18, the ECU 50 determines that the waste heat recoverer 4 has abnormality, and records it in the storage device. After finishing the process of step S18, the ECU 50 proceeds to step S15 and step S16. This restrains the vapor from entering the waste heat recoverer 4, when the waste heat recoverer 4 is considered to have abnormality. Due to this operation, the recovery of waste heat energy from the internal combustion engine 2 in the Rankine cycle system 1 is stopped, and at the same time, the cooling capability of the internal combustion engine 2 is maintained, and the operation of the internal combustion engine 2 is maintained. Besides, the ECU 50 notifies the operating person that the restricted operation mode has been entered, and that the Rankine cycle system 1 has abnormality.

If in step S17 the ECU 50 makes a negative determination, that is, if the rotation speed Nr of the turbine 42 of the waste heat recoverer 4 is greater than or equal to the multiplication product of the rotation speed N acquired from the map and the predetermined value C, the ECU 50 determines that the waste heat recoverer 4 does not have abnormality, and ends the subroutine of the abnormality detection process for the waste heat recoverer 4, and then proceeds to the abnormality detection process for the first electromagnetic valve 13 in step S20.

Thus, in the abnormality detection process for the waste heat recoverer 4, after it is determined that the cooling medium supply portion that supplies the cooling medium to the main body 20 of the internal combustion engine 2 does not have abnormality, the presence or absence of abnormality of the waste heat recoverer 4 (turbine system) is detected. Therefore, it can be detected whether the cooling medium supply portion of the internal combustion engine 2 has abnormality or the waste heat recoverer 4 has abnormality.

Figure 5:
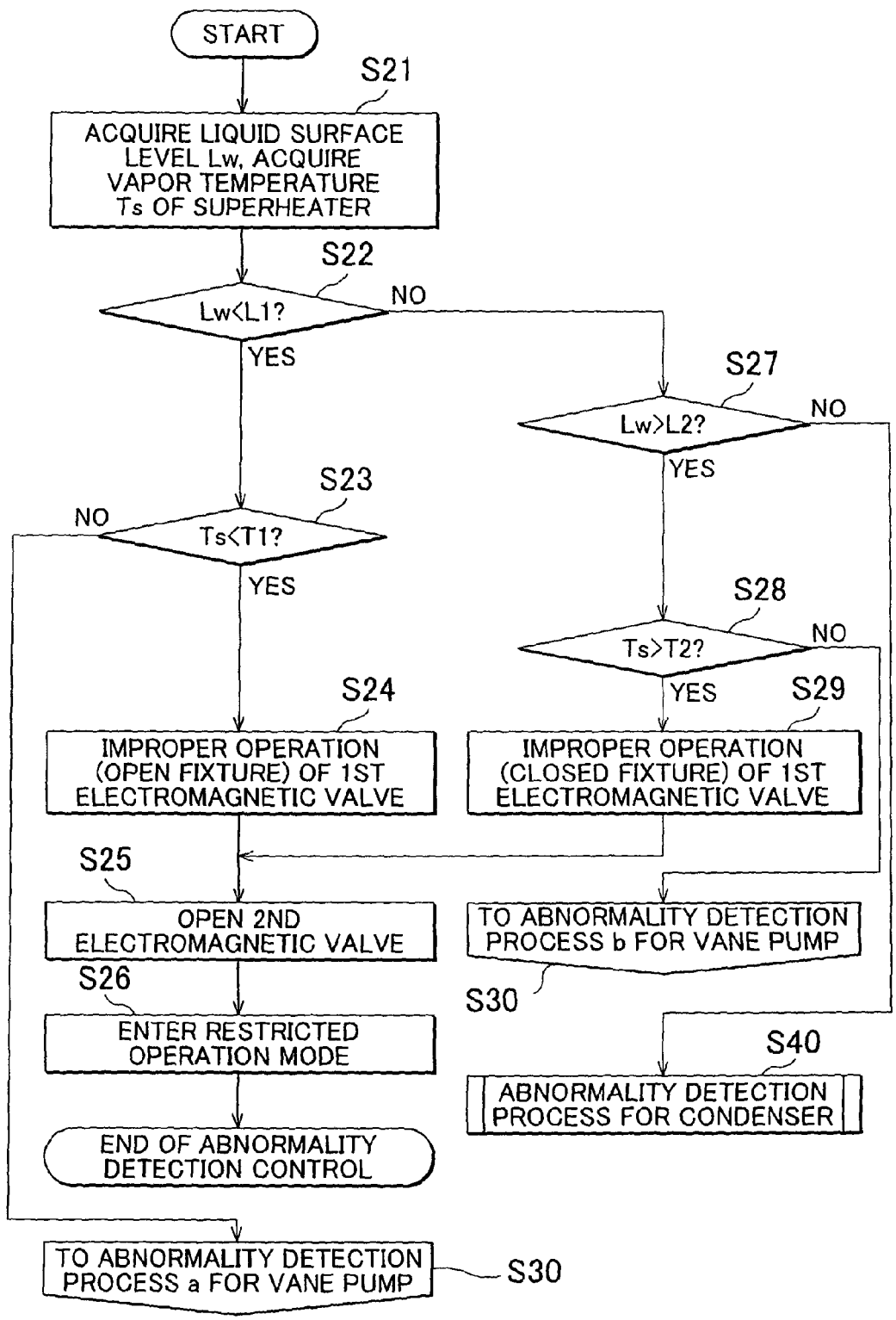
FIG. 5 is a flowchart showing a subroutine of the abnormality detection process for a first electromagnetic valve mentioned in FIG. 3.

Next, the abnormality detection process for the first electromagnetic valve 13 in step S20 will be described in detail. FIG. 5 is a flowchart showing a subroutine of the abnormality detection process for the first electromagnetic valve 13 in step S20. Hereinafter, the abnormality detection process for the first electromagnetic valve 13 will be described with reference to FIG. 5.

In step S21, the ECU 50 acquires a liquid surface level Lw of the liquid-phase cooling medium in the gas-liquid separator 5 which is detected by the liquid surface sensor 53. Besides, in step S21, the ECU 50 acquires a vapor temperature Ts in the superheater 7 which is detected by the vapor temperature sensor 54. After finishing the process of step S21, the ECU 50 proceeds to step S22.

In step S22, the ECU 50 determines whether the liquid surface level Lw of the liquid-phase cooling medium in the gas-liquid separator 5 is lower than a permissible minimum liquid surface level L1. In the case where it is determined that the Rankine cycle system 1 is normally operating, the amount of the liquid-phase cooling medium in the gas-liquid separator 5 is within a predetermined range. The permissible minimum liquid surface level L1 is a liquid surface level that the liquid surface sensor 53 indicates when the amount of the liquid-phase cooling medium in the gas-liquid separator 5 is a minimum permissible amount that is permissible in order for it to be determined that the Rankine cycle system 1 is operating normally. The amount of the liquid-phase cooling medium occurring at the time of the permissible minimum liquid surface level L1 can be regarded as a first threshold value in the invention. If in step S22 the ECU 50 makes an affirmative determination, that is, if the liquid surface level Lw of the liquid-phase cooling medium in the gas-liquid separator 5 is lower than the permissible minimum liquid surface level L1, the ECU 50 proceeds to step S23.

In step S23, the ECU 50 determines whether the vapor temperature Ts in the superheater 7 is lower than a permissible minimum temperature T1. In the case where it is determined that the Rankine cycle system 1 is normally operating, the temperature of the vapor in the superheater 7 is in a predetermined range. The permissible minimum temperature T1 is a minimum permissible temperature of the vapor at which the Rankine cycle system 1 normally operates. Besides, the permissible minimum temperature T1 can be regarded as a second threshold value in the invention. If in step S23 the ECU 50 makes an affirmative determination, that is, if the vapor temperature Ts in the superheater 7 is lower than the permissible minimum temperature T1, the ECU 50 proceeds to step S24.

A reason why the amount of the liquid-phase cooling medium in the gas-liquid separator 5 decreases is that the liquid-phase cooling medium is supplied to the superheater 7 by opening the first electromagnetic valve 13. Thus, in the case where the liquid-phase cooling medium is supplied to the superheater 7, conditions for the superheater 7 to be able to generate the vapor that allows the turbine 42 to stably recover energy have been established. If at this time the superheater 7 does not have abnormality, the vapor in the superheater 7 is high in temperature and pressure. On the other hand, if the conditions for the superheater 7 to be able to generate the vapor that allows the turbine 42 to stably recover energy have not been established, that is, if the vapor temperature in the superheater 7 is low, the first electromagnetic valve 13 is closed to shut down the supply of the liquid-phase cooling medium to the superheater 7. However, in the case where step S24 is reached, the amount of the liquid-phase cooling medium in the gas-liquid separator 5 is small and the temperature of the vapor in the superheater 7 is low. A conceivable reason for this is that although the first electromagnetic valve 13 needs to be closed, improper operation of the first electromagnetic valve 13 has occurred so that the first electromagnetic valve 13 has become fixed in the open valve state, and therefore excess amount of the liquid-phase cooling medium is flowing from the gas-liquid separator 5 to the superheater 7.

Therefore, if step S24 is reached, the ECU 50 determines that there is improper operation of the first electromagnetic valve 13, and records it in the storage device. The improper operation herein indicates that the first electromagnetic valve 13 has become fixed in the open valve state. A reason why the first electromagnetic valve 13 does not close is that dust or the like has entered the cooling passageway 3, and has been caught at the opening portion of the first electromagnetic valve 13, and has thus been prevented from closing. After finishing the process of step S24, the ECU 50 proceeds to step S25.

In step S25, the ECU 50 opens the second electromagnetic valve 17. As the second electromagnetic valve 17 opens, the gas-phase cooling medium (vapor) separated in the gas-liquid separator 5 is sent to the passageway 33 through the bypass passageway 16. Therefore, the cooling medium is sent to the condenser 8. Due to this operation, the recovery of waste heat energy obtained from the internal combustion engine 2 of the Rankine cycle system 1 is stopped, and at the same time, the route through which the cooling medium from the internal combustion engine 2 circulates is maintained, so that the cooling capability of the internal combustion engine 2 can be maintained and the internal combustion engine 2 can be protected.

Next, in step S26, the ECU 50 enters the restricted operation mode. Besides, the ECU 50 notifies the operating person that the restricted operation mode has been entered, and that the Rankine cycle system 1 has abnormality. After finishing the process of step S26, the ECU 50 ends the abnormality detection control.

If in step S22 the ECU 50 makes a negative determination, that is, if the liquid surface level Lw of the liquid-phase cooling medium in the gas-liquid separator 5 is greater than or equal to the permissible minimum liquid surface level L1, the ECU 50 proceeds to step S27.

In step S27, the ECU 50 determines whether the liquid surface level Lw of the liquid-phase cooling medium in the gas-liquid separator 5 is higher than a permissible maximum liquid surface level L2. The permissible maximum liquid surface level L2 is a liquid surface level that the liquid surface sensor 53 indicates when the amount of the liquid-phase cooling medium in the gas-liquid separator 5 is a maximum permissible amount that is permissible in order for it to be determined that the Rankine cycle system 1 is operating normally. The amount of the liquid-phase cooling medium occurring when the liquid surface level is the permissible maximum liquid surface level L2 can be regarded as a fourth threshold value in the invention. If in step S27 the ECU 50 makes an affirmative determination, that is, if the liquid surface level Lw of the liquid-phase cooling medium in the gas-liquid separator 5 is higher than the permissible maximum liquid surface level L2, the ECU 50 proceeds to step S28.

In step S28, the ECU 50 determines whether the vapor temperature Ts in the superheater 7 is higher than a permissible maximum temperature T2. The permissible maximum temperature T2 is a maximum permissible temperature of the vapor that is permissible in order for the Rankine cycle system 1 to normally operates. The permissible maximum temperature T2 can be regarded as a fifth threshold value in the invention. If in step S28 the ECU 50 makes an affirmative determination, that is, if the vapor temperature Ts of the superheater 7 is higher than the permissible maximum temperature T2, the ECU 50 proceeds to step S29.

In the case where step S29 is reached, the temperature of the vapor in the superheater 7 has risen excessively despite the presence of excess amount of the liquid-phase cooling medium in the gas-liquid separator 5. A conceivable reason for this is that the liquid-phase cooling medium is not being supplied from the gas-liquid separator 5 to the superheater 7. That is, it is conceivable that the cooling medium is not flowing in the passageway 32. Conceivable causes of the cooling medium not flowing through the passageway 32 are that the first electromagnetic valve 13 has become fixed in a closed valve state, and that there is clogging in the first electromagnetic valve 13. Therefore, in step S29, the ECU 50 determines that there is improper operation of the first electromagnetic valve 13, and records it in the storage device. It is to be noted that the improper operation herein is that the first electromagnetic valve 13 has become fixed in the closed valve state, or that due to abnormality of an electric system, the electric signal to the first electromagnetic valve 13 cannot be normally transferred. After finishing the process of step S29, the ECU 50 proceeds to step S25 and step S26. The processes that follow are the same as the above-described processes of step S25 and step S26.

If in step S28 the ECU 50 makes a negative determination, that is, if the vapor temperature Ts in the superheater 7 is greater than or equal to the permissible minimum temperature T1, the ECU 50 ends the subroutine of the abnormality detection process for the first electromagnetic valve 13, and proceeds to a section a of the abnormality detection process in step S30 for the vane pump 10.

If in step S28 the ECU 50 makes a negative determination, that is, if the vapor temperature Ts in the superheater 7 is less than or equal to the permissible maximum temperature T2, the ECU 50 ends the subroutine of the abnormality detection process for the first electromagnetic valve 13, and proceeds to a section b of the abnormality detection process in step S30 for the vane pump 10.

If in step S27 the ECU 50 makes a negative determination, that is, if the liquid surface level Lw of the liquid-phase cooling medium in the gas-liquid separator 5 is less than or equal to the permissible maximum liquid surface level L2, the ECU 50 ends the subroutine of the abnormality detection process for the first electromagnetic valve 13, and proceeds to the abnormality detection process in step S40 for the condenser 8.

As described above, in the abnormality detection process for the first electromagnetic valve 13, when abnormality is not detected regarding the cooling supply portion of the internal combustion engine 2, the ECU 50 detects the presence or absence of abnormality of the first electromagnetic valve 13 on the basis of the amount of the liquid-phase cooling medium in the gas-liquid separator 5 and the temperature of the gas-phase cooling medium in the superheater 7. Furthermore, since the ECU 50 stops the operation of the Rankine cycle when abnormality of the first electromagnetic valve 13 is detected, the internal combustion engine 2 can be protected.

Figure 6:
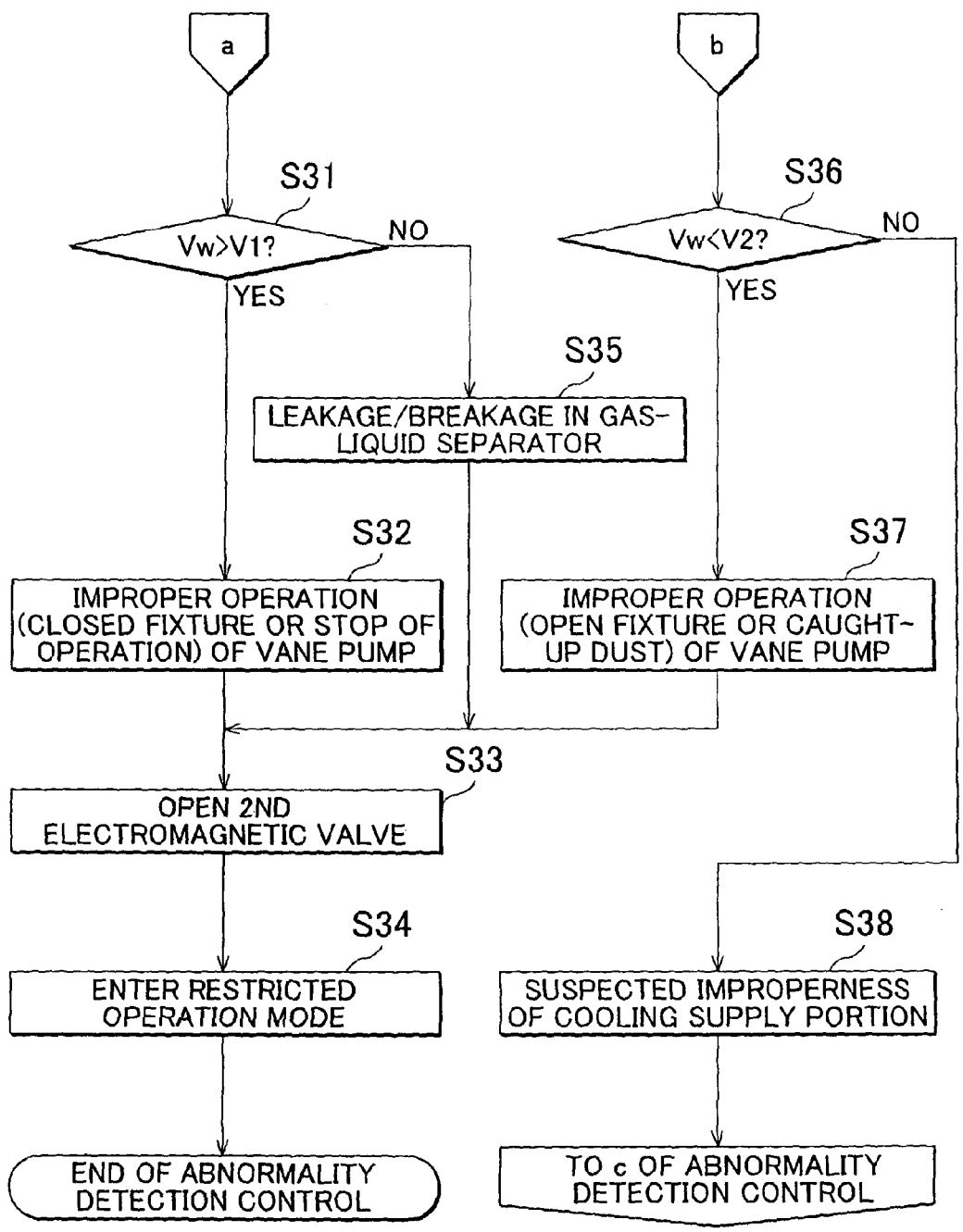
FIG. 6 is a flowchart showing a subroutine of the abnormality detection process for a vane pump mentioned in FIG. 3.

Next, the abnormality detection process in step S30 for the vane pump 10 will be described in detail. FIG. 6 is a flowchart showing a subroutine of the abnormality detection process in step S30 for the vane pump 10. Hereinafter, the abnormality detection process for the vane pump 10 will be described with reference to FIG. 6.

Firstly, the input from a connector a of the section as shown in the flowchart in FIG. 6 will be described. The ECU 50 proceeds from the connector a to step S31.

In step S31, the ECU 50 determines whether the amount Vw of the liquid-phase cooling medium in the condensate header tank 15 is greater than a permissible maximum amount V1. The amount Vw of the liquid-phase cooling medium in the condensate header tank 15 is calculated from the liquid surface level in the condensate header tank 15 that the heeder tank liquid surface sensor 58 measures. The permissible maximum amount V1 is a maximum value of the amount of the liquid-phase cooling medium in the condensate header tank 15 which is permissible in order for it to be recognized that the Rankine cycle system 1 is being normally operated. The permissible maximum amount V1 can be regarded as a third threshold value in the invention. If in step S31 the ECU 50 makes an affirmative determination, that is, if the amount Vw of the liquid-phase cooling medium in the condensate header tank 15 is greater than the permissible maximum amount V1, the ECU 50 proceeds to step S32.

In step S32, the ECU 50 determines that there is improper operation of the vane pump 10, and records it in the storage device. The improper operation herein is closed fixture of the vane pump 10 or an operation stop thereof. The closed fixture is an improper operation in which the rotor 102 of the vane pump 10 becomes improper in rotation due to fixture of the sliding portions of the cam ring 101 and of the vanes 103 for some causes, so that the pump 10 becomes unable to pump the cooling medium. Besides, the operation stop is an improper operation that occurs when a drive stage related to the rotation of the rotor 102 fails. If the closed fixture or operation stop of the vane pump 10 occurs, the circulation of the cooling medium stops, so that the amount of the liquid-phase cooling medium in the condensate header tank 15 increases. Besides, the amount of the liquid-phase cooling medium supplied into the gas-liquid separator 5 also decreases. Therefore, under the conditions for step S32 to be reached, that is, in the case where while the amount of the liquid-phase cooing medium in the gas-liquid separator 5 is small, abnormality of the first electromagnetic valve 13 is not found and the amount of the liquid-phase cooling medium in the condensate header tank 15 is large, it is determined that the closed fixture of the vane pump 10 or the operation stop thereof has occurred. After finishing the process of step S32, the ECU 50 proceeds to the processes of step S33 and step S34.

In step S33, the ECU 50 opens the second electromagnetic valve 17. As the second electromagnetic valve 17 opens, the gas-phase cooling medium (vapor) separated in the gas-liquid separator 5 is sent to the passageway 33 through the bypass passageway 16. Since the cooling medium bypasses the superheater 7 and the waste heat recoverer 4, the amount of recovery of waste heat into the cooling medium reduces, and the recovery of waste heat energy obtained from the internal combustion engine 2 which is carried out in the Rankine cycle system 1 is stopped. However, since the temperature of the cooling medium declines, the load on the condenser 8 cooling the cooling medium reduces, so that the damage caused by inflow of excess amount of vapor can be prevented.

Next, in step S34, the ECU 50 enters the restricted operation mode. This makes it possible to operate the Rankine cycled system 1 in a region that allows operation of the internal combustion engine 2 and also to safely stop the system 1. Besides, the ECU 50 notifies the operating person that the restricted operation mode has been entered, and that the Rankine cycle system 1 has abnormality. After finishing the process of step S34, the ECU 50 ends the abnormality detection control.

If in step S31 the ECU 50 makes a negative determination, that is, if the amount Vw of the liquid-phase cooling medium in the condensate header tank 15 is less than or equal to the permissible maximum amount V1, the ECU 50 proceeds to step S35.

In step S35, the ECU 50 determines that the gas-liquid separator 5 has abnormality (breakage or leakage), and records it in the storage device. Specifically, the ECU 50 determines that the gas-liquid separator 5 is broken provided that the amount of the liquid-phase cooling medium in the gas-liquid separator 5 is less than the first threshold value, and that the temperature of the gas-phase cooling medium in the superheater 7 is greater than or equal to the second threshold value, and that the amount of the liquid-phase cooling medium in the condensate header tank 15 is less than or equal to the third threshold value. After finishing the process of step S35, the ECU 50 proceeds to the processes of step S33 and step S34. The processes that follow are substantially the same as the above-described processes of steps S33 and S34.

Due to the processes of steps S31, S32 and S35, the presence or absence of the closed fixture of the vane pump 10 can be detected, and the presence or absence of failure of the gas-liquid separator 5 can be detected. As a result, it is possible to determine whether the cause of the improper operation of the Rankine cycle system 1 is the closed fixture of the vane pump 10 or failure of the gas-liquid separator 5.

Next, the input from the connector b shown in the flowchart in FIG. 6 will be described. The ECU 50 proceeds from the connector b to step S36.

In step S36, the ECU 50 determines whether the amount Vw of the liquid-phase cooling medium in the condensate header tank 15 is smaller than a permissible minimum amount V2. The permissible minimum amount V2 is a minimum value of the amount of the liquid-phase cooling medium in the condensate header tank 15 which can occur when it is recognized that the Rankine cycle system 1 is being normally operated. The permissible minimum amount V2 can be regarded as a sixth threshold value in the invention. If in step S36 the ECU 50 makes an affirmative determination, that is, if the amount Vw of the liquid-phase cooling medium in the condensate header tank 15 is smaller than the permissible minimum amount V2, the ECU 50 proceeds to step S37.

In step S37, the ECU 50 determines that there is improper operation of the vane pump 10, and records it in the storage device. The improper operation herein is an open fixture of the vane pump 10 or an improper closure thereof due to caught-up dust or the like. The open fixture is an improper operation in which the seal characteristic of the vane pump 10 is lost and the cooling medium freely moves when the pump 10 is not driven. A reason for the loss of the seal characteristic is that although the vane pump 10 operates properly with the distal ends of the vanes 103 contacting the wall surface of the cam ring 101, the force that presses the vanes 103 to the side of the wall surface of the cam ring 101 declines due to degradation of the springs 104 or the like so that the distal ends of the vanes 103 become unable to contact the wall surface of the cam ring 101. Besides, the improper closure due to caught-up dust or the like is an improper operation in which dust or the like attaches to a distal end portion of a vane 103 so that the seal characteristic is lost, and therefore the cooling medium freely moves when the pump 10 is not driven. When the vane pump 10 has the open fixture or the improper closure due to caught-up dust or the like, the cooling medium freely flows, so that even when the vane pump 10 is in a stopped state, the liquid-phase cooling medium in the condensate header tank 15 flows out. The liquid-phase cooling medium that has flown out of the condensate header tank 15 is supplied to the gas-liquid separator 5, so that the amount of the liquid-phase cooling medium in the gas-liquid separator 5 increases. Therefore, under the conditions for step S37 to be reached, that is, in the case where while the amount of the liquid-phase cooing medium in the gas-liquid separator 5 is large, abnormality of the first electromagnetic valve 13 is not found and the amount of the liquid-phase cooling medium in the condensate header tank 15 is small, it is determined that the open fixture of the vane pump 10 or the improper closure thereof due to caught-up dust or the like has occurred. After finishing the process of step S37, the ECU 50 proceeds to steps S33 and S34. The processes that follow are substantially the same as the above-described processes of steps S33 and S34.

Incidentally, in the case of the open fixture of the vane pump 10 or the improper closure thereof due to caught-up dust or the like, it is conceivable that the movement of the cooling medium may be determined on the basis of the amounts of liquid on the upstream and downstream sides of the vane pump 10 and the position at which the vane pump 10 is disposed in the vertical direction (position in the up-down direction). Specifically, depending on the amounts of liquid on the upstream and downstream sides of the vane pump 10 and the position of disposal of the vane pump 10 in the vertical direction (position thereof in the up-down direction), the open fixture or the improper closure due to caught-up dust or the like results in a decreased amount of the liquid-phase cooling medium in the gas-liquid separator 5 and an increased amount of the liquid-phase cooling medium in the condensate header tank 15, so that the step S32 is reached. In such a case, therefore, in step S32, the presence or absence of the open fixture of the vane pump 10 or of the improper closure thereof due to caught-up dust or the like may be estimated.

If in step S36 the ECU 50 makes a negative determination, that is, if the amount Vw of the liquid-phase cooling medium in the condensate header tank 15 is greater than or equal to the permissible minimum amount V2, the ECU 50 proceeds to step S38.

In step S38, the ECU 50 determines that there is suspicion that the cooling medium supply portion of the internal combustion engine 2 has abnormality, and then proceeds to a section c of the abnormality detection control of the abnormality detection apparatus 100 shown in FIG. 3. In the case where step S38 is reached, abnormality is not detected regarding any one of the first electromagnetic valve 13, the waste heat recoverer 4, the gas-liquid separator 5 and the vane pump 10. Therefore, the ECU 50 suspects abnormality of the cooling medium supply portion of the internal combustion engine 2, and performs re-determination regarding abnormality of the cooling medium supply portion of the internal combustion engine 2. Therefore, the ECU 50 performs the determination regarding abnormality of the cooling medium supply portion of the internal combustion engine 2 once again provided that the amount of the liquid-phase cooling medium in the gas-liquid separator 5 is larger than the fourth threshold value, and that the temperature of the gas-phase cooling medium in the superheater 7 is less than or equal to the fifth threshold value, and that the amount of the liquid-phase cooling medium in the condensate header tank 15 is greater than or equal to the sixth threshold value.

Due to the processes of steps S36, S37 and S38, the presence or absence of the open fixture of the vane pump 10 can be detected, and the presence or absence of abnormality of the cooling medium supply portion of the internal combustion engine 2 can be determined once again. As a result, it can be determined whether the cause of the improper operation of the Rankine cycle system 1 is the open fixture of the vane pump 10 or abnormality of the cooling medium supply portion of the internal combustion engine 2.

Thus, in the abnormality detection process for the vane pump 10, the detection of the presence or absence of abnormality of the vane pump 10 is executed during a state in which abnormality is not detected regarding either the waste heat recoverer 4 or the first electromagnetic valve 13. In the abnormality detection control, when the amount of the liquid-phase cooling medium in the gas-liquid separator 5 is outside the predetermined range and the temperature of the gas-phase cooling medium in the superheater 7 is within the predetermined range, it is possible to determine whether the vane pump 10 is abnormal and detect that the vane pump 10 is abnormal, on the basis of the amount of liquid in the condensate header tank 15. Besides, during a state in which abnormality of the vane pump 10 is not detected, the ECU 50 determines whether the gas-liquid separator 5 has abnormality, or suspects that the cooling medium supply portion of the internal combustion engine 2 has abnormality, and performs the detection of the presence or absence of abnormality of the cooling medium supply portion of the internal combustion engine 2 once again.

Next, the abnormality detection process in step S40 for the condenser 8 will be described in detail. FIG. 7 is a flowchart showing a subroutine of the abnormality detection process in step S40 for the condenser 8. Hereinafter, the abnormality detection process for the condenser 8 will be described with reference to FIG. 7.

In step S41, the ECU 50 acquires a temperature Tw of the cooling medium having passed through the condenser 8 which is detected by the condensate water temperature sensor 57. After finishing the process of step S41, the ECU 50 proceeds to step S42.

In step S42, the ECU 50 determines whether the temperature Tw of the cooling medium having passed through the condenser 8 is greater than a permissible condensate temperature T3. The permissible condensate temperature T3 is a maximum temperature that the cooling medium having passed through the condenser 8 is permitted to have. If in step S42 the ECU 50 makes an affirmative determination, that is, if the temperature Tw of the cooling medium having passed through the condenser 8 is greater than the permissible condensate temperature T3, the ECU 50 proceeds to step S43.

In step S43, the ECU 50 determines that the improper operation of the condenser 8 has occurred, and records it in the storage device. In this case, since the temperature Tw of the cooling medium having passed through the condenser 8 exceeds the permissible upper-limit temperature, the condenser is considered to have abnormality. After finishing the process of step S43, the ECU 50 proceeds to step S44.

In step S44, the ECU 50 opens the second electromagnetic valve 17. As the second electromagnetic valve 17 opens, the gas-phase cooling medium (vapor) separated by the gas-liquid separator 5 is sent to the passageway 33 through the bypass passageway 16. In the case of improper operation of the condenser 8, it is considered that the cooling capability of the condenser 8 has declined and the cooling medium whose temperature is greater than or equal to a temperature that can be reduced by cooling in the condenser 8 is flowing into the condenser 8. Therefore, increase of the temperature of the gas-phase cooling medium of the superheater 7 is prevented by sending gas-phase cooling medium separated by the gas-liquid separator 5 into the bypass passageway 16. Specifically, since the cooling medium flowing into the condenser 8 declines in temperature, the cooling medium can be cooled to a temperature that is suitable for the cooling of the engine main body 20 by using the cooling capability of the condenser 8 with the abnormality. Thus, while the recovery of waste heat energy obtained from the internal combustion engine 2 which is performed in the Rankine cycle system 1 is stopped, and the cooling capability of the internal combustion engine 2 is maintained, and the internal combustion engine 2 is protected, and the operation thereof is maintained. Subsequently in step S45, the ECU 50 enters the restricted operation mode. Besides, the ECU 50 notifies the operating person that the restricted operation mode has been entered, and that the Rankine cycle system 1 has abnormality.

If in step S42 the ECU 50 makes a negative determination, that is, if the temperature Tw of the cooling medium having passed through the condenser 8 is less than or equal to the permissible condensate temperature T3, the ECU 50 ends the subroutine of the abnormality detection process for the condenser 8, and returns to the abnormality detection control shown in FIG. 3.

Thus, in the abnormality detection process for the condenser 8, abnormality of the condenser 8 can be detected. Furthermore, by stopping the operation of the Rankine cycle after detecting abnormality of the condenser 8, the internal combustion engine 2 can be protected.

The abnormality detection apparatus 100 in this embodiment detects the presence or absence of abnormality of the first electromagnetic valve 13 after determining that neither the cooling medium supply portion of the internal combustion engine 2 nor the waste heat recoverer 4 has abnormality. Then, if it is found that the first electromagnetic valve 13 does not have abnormality either, the abnormality detection apparatus 100 detects the presence or absence of abnormality of the vane pump 10, and the presence or absence of abnormality of the condenser 8. Therefore, the abnormality detection apparatus 100 is able to detect whether the present abnormality of the Rankine cycle system 1 is abnormality of the cooling medium supply portion, abnormality of the waste heat recoverer 4, abnormality of the first electromagnetic valve 13, abnormality of the vane pump 10 or abnormality of the condenser 8. Therefore, the abnormality detection apparatus 100 synthetically detects the cause of abnormality in the Rankine cycle system 1, and specifically determines the site of abnormality with good accuracy.

The abnormality detection apparatus 100 for the Rankine cycle system 1 described above can be mounted in, for example, a vehicle. In the case where the abnormality detection apparatus 100 is mounted in a vehicle, when the abnormality detection apparatus 100 detects abnormality, the apparatus 100 turns on a diagnosis lamp, and notifies a driver of the vehicle of the abnormality, and makes it possible for the driver to drive the vehicle to a safe place by entering a safety drive mode in which the output of the engine (internal combustion engine) is restricted by restricted operation. Besides, since the recovery of waste heat when abnormality is detected, breakage of the internal combustion engine and various component parts of the vehicle can also be prevented. Therefore, the burden of repair of the vehicle can be minimized.

The foregoing embodiments are mere examples for carrying out the invention. It should be apparent from the foregoing description that the invention is not limited to the foregoing embodiments or examples, but that various modifications of the embodiments are within the scope of the invention, and that within the scope of the invention, other various embodiments and possible.

The invention claimed is:

1. An abnormality detection apparatus for a Rankine cycle system comprising:
    a main body of an internal combustion engine which vaporizes a cooling medium that circulates in the internal combustion engine by giving waste heat to the cooling medium;
    a gas-liquid separator that, downstream of the main body, separates the cooling medium into a gas-phase cooling medium and a liquid-phase cooling medium;
    a superheater that, downstream of the gas-liquid separator, gives waste heat of the internal combustion engine to the cooling medium;
    a waste heat recoverer that, downstream of the superheater, recovers energy of the waste heat that the cooling medium has obtained;
    a condenser that, downstream of the waste heat recoverer, condenses the gas-phase cooling medium;
    a header tank that is disposed downstream of the condenser, and that stores the liquid-phase cooling medium;
    a pumper that is positioned between the header tank and the main body and that pumps the liquid-phase cooling medium in the header tank to the main body,
    a cooling medium amount detector that detects an amount of the liquid-phase cooling medium in the gas-liquid separator;
    a temperature detector that detects temperature of the gas-phase cooling medium in the superheater;

a header tank cooling medium amount detector that detects an amount of the liquid-phase cooling medium in the header tank;

a first abnormality detection portion that detects abnormality of a cooling medium supply portion that supplies the cooling medium to the main body; and a second abnormality detection portion that detects abnormality of the pumper based on the amount of the liquid-phase cooling medium in the gas-liquid separator, the temperature of the gas-phase cooling medium in the superheater and the amount of the liquid-phase cooling medium in the header tank if abnormality is not detected by the first abnormality detection portion.

2. The abnormality detection apparatus according to claim 1, wherein the second abnormality detection portion determines that the pumper is in a state of closed fixture or operation stop provided that the amount of liquid-phase cooling medium in the gas-liquid separator is less than a first threshold value, and that the temperature of the gas-phase cooling medium in the superheater is greater than or equal to a second threshold value, and that the amount of the liquid-phase cooling medium in the header tank is greater than a third threshold value.

3. The abnormality detection apparatus according to claim 1, wherein the second abnormality detection portion determines that the gas-liquid separator has abnormality provided that the amount of the liquid-phase cooling medium in the gas-liquid separator is less than a first threshold value, and that the temperature of the gas-phase cooling medium in the superheater is greater than or equal to a second threshold value, and that the amount of the liquid-phase cooling medium in the header tank is less than or equal to a third threshold value.

4. The abnormality detection apparatus according to claim 1, wherein the second abnormality detection portion determines that there is open fixture of the pumper or improper closure of the pumper provided that the amount of the liquid-phase cooling medium in the gas-liquid separator is greater than a fourth threshold value, and that the temperature of the gas-phase cooling medium in the superheater is less than or equal to a fifth threshold value, and that the amount of the liquid-phase cooling medium in the header tank is less than a sixth threshold value.

5. The abnormality detection apparatus according to claim 1, wherein the second abnormality detection portion performs re-determination regarding abnormality of the cooling medium supply portion provided that the amount of the liquid-phase cooling medium in the gas-liquid separator is greater than a fourth threshold value, and that the temperature of the gas-phase cooling medium in the superheater is less than or equal to a fifth threshold value, and that the amount of the liquid-phase cooling medium in the header tank is greater than or equal to a sixth threshold value.

6. An abnormality detection method for a Rankine cycle system that includes:

a main body of an internal combustion engine which vaporizes a cooling medium that circulates in the internal combustion engine by giving waste heat to the cooling medium;

a cooling medium supply portion that supplies the cooling medium to the main body;

a gas-liquid separator that, downstream of the main body, separates the cooling medium into a gas-phase cooling medium and a liquid-phase cooling medium;

a superheater that, downstream of the gas-liquid separator, gives waste heat of the internal combustion engine to the cooling medium;

a header tank that, downstream of the condenser, stores the liquid-phase cooling medium; and a pumper that is positioned between the header tank and the main body and that pumps the liquid-phase cooling medium in the header tank to the main body, the abnormality detection method comprising:

detecting amount of the liquid-phase cooling medium in the gas-liquid separator;

detecting temperature of the gas-phase cooling medium in the superheater;

detecting amount of the liquid-phase cooling medium in the header tank;

detecting whether there is abnormality of the cooling medium supply portion; and detecting whether there is abnormality of the pumper based on the amount of the liquid-phase cooling medium in the gas-liquid separator, the temperature of the gas-phase cooling medium in the superheater and the amount of the liquid-phase cooling medium in the header tank if abnormality of the cooling medium supply portion is not detected.

* * * * *